United States Patent
Ishida et al.

(10) Patent No.: US 8,249,138 B2
(45) Date of Patent: Aug. 21, 2012

(54) SYMBOL ANALYZING DEVICE, SYMBOL ANALYZING METHOD, AND INFORMATION STORAGE MEDIUM

(75) Inventors: Takayuki Ishida, Kanagawa (JP); Hirotoshi Maegawa, Tokyo (JP); Hiroki Kato, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1260 days.

(21) Appl. No.: 11/596,232

(22) PCT Filed: Nov. 17, 2005

(86) PCT No.: PCT/JP2005/021158
§ 371 (c)(1),
(2), (4) Date: Nov. 19, 2007

(87) PCT Pub. No.: WO2006/100800
PCT Pub. Date: Sep. 28, 2006

(65) Prior Publication Data
US 2008/0260074 A1    Oct. 23, 2008

(30) Foreign Application Priority Data
Mar. 24, 2005 (JP) ................ 2005-086711

(51) Int. Cl.
 H04B 17/00 (2006.01)
(52) U.S. Cl. ......... 375/228; 375/260; 375/262; 375/267
(58) Field of Classification Search ........... 375/228, 375/260, 262, 267; 382/172, 190, 305, 318, 382/173, 164, 274; 725/34, 46, 52
See application file for complete search history.

(56) References Cited

U.S. PATENT DOCUMENTS

| | | | |
|---|---|---|---|
| 6,608,633 B1 * | 8/2003 | Sciammarella et al. | 715/700 |
| 6,704,931 B1 * | 3/2004 | Schaffer et al. | 725/46 |
| 6,996,572 B1 * | 2/2006 | Chakrabarti et al. | 715/205 |
| 2003/0236778 A1 | 12/2003 | Masumoto et al. | |

FOREIGN PATENT DOCUMENTS

| | | |
|---|---|---|
| JP | 2002 041545 | 2/2002 |
| JP | 2002 41571 | 2/2002 |
| JP | 2003 203091 | 7/2003 |

OTHER PUBLICATIONS

Patent Abstracts of Japan, publication No. 2004-030122, publication date Jan. 29, 2004.
Japanese Office Action No. 2005-86711 dated Feb. 14, 2006, Jun. 20, 2006 and Dec. 9, 2008 and partial Translations of the Office Action.

* cited by examiner

*Primary Examiner* — Dhaval Patel
(74) *Attorney, Agent, or Firm* — Frommer Lawrence & Haug LLP; William S. Frommer; Paul A. Levy

(57) ABSTRACT

To provide a symbol analyzing device capable of carrying out post hoc analysis of the meaning of a symbol used in communications. The symbol analyzing device comprises a symbol acquiring section (14) for acquiring, for each of the plurality of communications (for example, a message), one or more symbols (for example, a word) used in the communications; a first symbol position coordinates calculating section (16) for calculating position coordinates of each symbol in a first space having coordinate axes each corresponding to each of the plurality of communications; a similarity matrix calculating section (18) and an eigenvalue/eigenvector calculating section (20) for calculating one or more characteristic directions in the first space based on the position coordinates calculated by the first symbol position coordinates calculating section (16); and a second symbol position coordinates calculating section (22) for calculating position coordinates of each symbol in a second space having coordinate axes each corresponding to each of the characteristic directions, based on the characteristic directions calculated and the position coordinates calculated by the first symbol position coordinates calculating section (16).

17 Claims, 4 Drawing Sheets

FIRST SPACE

SECOND SPACE

I # SYMBOL ANALYZING DEVICE, SYMBOL ANALYZING METHOD, AND INFORMATION STORAGE MEDIUM

TECHNICAL FIELD

The present invention relates to a symbol analyzing device, a symbol analyzing method, and an information storage medium, and in particular to a technique for analyzing the meaning of a symbol contained in communications.

BACKGROUND ART

A vast amount of communication is being carried out by utilizing a variety of communication networks including a computer network. These communications are carried out in a variety of forms including electronic mail, electronic bulletin boards, chatting in chat system, interaction in chat rooms of a chat system, assignment or exchange of static or moving images, assignment or exchange of items for a game, and so forth. In these communications, a plurality of symbols are transmitted either uni- or bi-directionally.

Conventionally, it has been difficult to conduct post hoc analysis of the meaning of the symbols used in such communication. This makes it difficult to conduct a post hoc analysis as for what kind of communication is actually carried out in each place of communication. Therefore, an arrangement is widely adopted in which, with respect to a place of communication, the title of an electronic mail or an electronic bulletin board is given, or the title is given by means of a variety of directory services, to thereby set in advance the meaning of a group of symbols used therein or to thereby set the information concerning what kind of communication takes place therein.

However, as the meanings of symbols may gradually change as people proceed with the communication, the actual meanings of the symbols used in communications cannot be understood without post hoc analysis. In particular, as changing of the meanings of the symbols used in a network community is significant, an arrangement for enabling post hoc analysis of the meanings of the symbols used in communications being exchanged in a network community is significantly meaningful.

The present invention has been conceived in view of the above. One of the objects of the present invention is to provide a symbol analyzing device capable of post hoc analysis of the meanings of the symbols used in communications, a symbol analyzing method, and an information storage medium Another object of the present invention is to provide a method for analyzing, based on the analyzed meanings of the symbols, the trend of each communication. In that case, each communication may be a new communication which is different from the communication which is used in the analysis of the meanings of the symbols.

DISCLOSURE OF INVENTION

In order to achieve the above described objects, there is provided a symbol analyzing device for analyzing a symbol used in a plurality of communications, comprising: symbol acquiring means for acquiring, for each of the plurality of communications, one or more symbols used in the communication; first symbol position coordinates calculating means for calculating position coordinates of each symbol acquired for each of the plurality of communications by the symbol acquiring means, in a first space having coordinate axes each corresponding to each of the plurality of communications; characteristic direction calculating means for calculating one or more characteristic directions in the first space based on the position coordinates calculated by the first symbol position coordinates calculating means; and second symbol position coordinates calculating means for calculating position coordinates of each symbol acquired by the symbol acquiring means, in a second space having coordinate axes each corresponding to each of the characteristic directions calculated by the characteristic direction calculating means, based on the characteristic directions calculated by the characteristic direction calculating means and the position coordinates calculated by the first symbol position coordinates calculating means.

Also, there is provided a symbol analyzing method for analyzing a symbol used in a plurality of communications, comprising: a symbol acquiring step of acquiring, for each of the plurality of communications, one or more symbols used in the communication; a first symbol position coordinates calculating step of calculating position coordinates of each symbol acquired for each of the plurality of communications in the symbol acquiring step, in a first space having coordinate axes each corresponding to each of the plurality of communications; a characteristic direction calculating step of calculating one or more characteristic directions in the first space based on the position coordinates calculated in the first symbol position coordinates calculating step; and a second symbol position coordinates calculating step of calculating position coordinates of each symbol acquired in the symbol acquiring step, in a second space having coordinate axes each corresponding to each of the characteristic directions calculated at the characteristic direction calculating step, based on the characteristic direction calculated in the characteristic directions calculating step and the position coordinates calculated in the first symbol position coordinates calculating step.

Also, there is provided an information storage medium which stores a program for causing a computer to function as: symbol acquiring means for acquiring, for each of a plurality of communications, one or more symbols used in the communication; first symbol position coordinates calculating means for calculating position coordinates of each symbol acquired for each of the plurality of communications by the symbol acquiring means, in a first space having coordinate axes each corresponding to each of the plurality of communications; characteristic direction calculating means for calculating one or more characteristic directions in the first space based on the position coordinates calculated by the first symbol position coordinates calculating means; and second symbol position coordinates calculating means for calculating position coordinates of each symbol acquired by the symbol acquiring means, in a second space having coordinate axes each corresponding to each of the characteristic directions calculated by the characteristic direction calculating means, based on the characteristic directions calculated by the characteristic direction calculating means and the position coordinates calculated by the first symbol position coordinates calculating means. The information storage medium may be a computer readable information storage medium, including, for example, a DVD-ROM, a CD-ROM, a ROM cartridge, and so forth.

In one communication, generally, a group of symbols which have mutual correlation (association in terms of meaning) are used. While relying on this fact, the present invention enables post hoc analysis of the meaning of each symbol used in communications.

Specifically, as for a plurality of communications, one or more symbols used in each communication is acquired. For example, from the communication "Japanese lessons are interesting", symbols "Japanese" and "lesson" are acquired. Thereafter, the acquired symbol is placed in a predetermined first space. Each of the coordinate axes of the first space corresponds to each of the plurality of communications. In the present invention, the position coordinates of each symbol in the first space are calculated.

Further, based on the position coordinates, one or more characteristic directions in the first space are calculated. For example, the direction in the first space, which extends in an area where many symbols are placed, may be calculated as a characteristic direction. Thereafter, based on the thus calculated characteristic direction and the position coordinates of each symbol in the first space, position coordinates of each symbol in a second space which has coordinate axes each corresponding to each characteristic direction are calculated.

It should be noted that each of the coordinate axes of the first space corresponds to each communication, and the characteristic direction thereof can be considered as showing a typical meaning which is implicated in a variety of communications being exchanged in an actual community. For example, as for the communications such as "a Japanese lessons a interesting", "I do not like mathematics lessons", "I like physical education lessons very much", and "today's science lesson will take place outside", the symbols, such as "Japanese", "mathematics", "physical education", "science", "lesson" and so forth are placed in the first space which has the coordinate axes corresponding to these communications, and characteristic directions thereof are calculated. It can then be understood that, compared to other symbols such as "professional baseball", "beer", and so forth, a typical meaning such as "(used in the context of) school" is more strongly implicated in the characteristic direction.

According to the present invention, as each symbol is placed in the second space which has coordinate axes corresponding to the characteristic directions, post hoc analysis concerning the correlation between each symbol and a typical meaning which is implicated in a variety of communications being actually exchanged in a real community can be attained.

According to one aspect of the present invention, the symbol analyzing device may further comprise space image displaying means for displaying all or a part of a space image of the second space where the position coordinates calculated by the second symbol position coordinates calculating means are distinctively displayed With this arrangement, the correlation between each symbol and a typical meaning implicated in a variety of communications being exchanged in a real community can be readily and visually understood.

According to another aspect of the present invention, the first symbol position coordinates calculating means may calculate, with respect to each symbol, position coordinates which include, as coordinate components thereof, values calculated depending on use of the symbol in each communication. The value may be, for example, the frequency of use of a symbol in each communication, or a value indicating whether the symbol is used or not. According to this aspect, the position of each symbol in the first space is changed depending on the use in each communication.

According to this aspect, the characteristic direction calculating means may calculate one or more eigenvectors of a similarity matrix which has, as elements, similarities between the position coordinates calculated by the first symbol position coordinates calculating means, and determine the one or more eigenvectors as one or more characteristic directions. The similarity matrix is a real symmetric matrix, and the eigenvectors thereof can be calculated by means of power multiplication. Power multiplication has a function for enhancing a characteristic element and averaging a non-characteristic element of a matrix element. Therefore, an eigenvector calculated by means of power multiplication can be considered as expressing the characteristic direction implicated in the first space, in an explicit manner.

Also, the second symbol position coordinates calculating means may calculate position coordinates in the second space of each symbol acquired by the symbol acquiring means, based on an inner product of the characteristic direction calculated by the characteristic direction calculating means and the position coordinates calculated by the first symbol position coordinates calculating means. With this arrangement, as for each symbol placed in the first space, the components thereof in the characteristic directions can be readily calculated.

Also, according to yet another aspect of the present invention, the symbol analyzing device may further comprise communication position coordinates calculating means for calculating, for a communication included in, or different from, the plurality of communications, position coordinates of the communication in the second space based on the position coordinates of symbols used in the communication, in the second space. With this arrangement, post hoc analysis concerning the correlation between a communication and a typical meaning implicated in a variety of communications that have taken place in a real communication can be attained.

According to this aspect, the space image displaying means may display the space image where the position coordinates calculated by the communication position coordinates calculating means are additionally distinctively displayed. With this arrangement, correlation between a communication and a typical meaning implicated in a variety of communications that have taken place in a real communication can be visually understood.

BEST MODE FOR CARRYING OUT THE INVENTION

In the following, one embodiment of the present invention will be described in detail with reference to the accompanied drawings.

A symbol analyzing device in this embodiment is a device for acquiring a plurality of data items concerning communication carried out through a computer network, and for analyzing the meanings of the symbols used in the communication. It is assumed here that the acquired communication is a message which is exchanged via an electronic bulletin board provided in a communication network including the Internet. Here, a symbol constitutes a communication, and specifically, a word which constitutes a message.

This symbol analyzing device, while relying on the fact that the symbols used in one message have mutual correlation in terms of meaning, acquires a plurality of messages from an electronic bulletin board system and analyzes the meaning of the symbols used in the messages.

For this purpose, initially, the words which are used in each message are acquired. Then, a first space which is defined by the coordinate axes each corresponding to each message is prepared before placing each word in the first space. Thereafter, the position coordinates of each word in the first space are calculated.

Specifically, for each word, the value of a coordinate component corresponding to each message is calculated according to the use of the word in the message. That is, assuming the k-th component of the position coordinates gi of the word Wi in the first space is defined as gki, as shown in the following Expression (1), the value thereof is calculated according to the use of the word Wi in the k-th message. Specifically, when the word Wi is used once or more in the k-th message, the value of gki is one. When the word Wi is not used at all in the k-th message, the value of gki is zero.

[Expression 1]

$$g_i = \begin{pmatrix} g_{1i} \\ g_{2i} \\ \vdots \\ g_{mi} \end{pmatrix} \quad (1)$$

Figure 1:
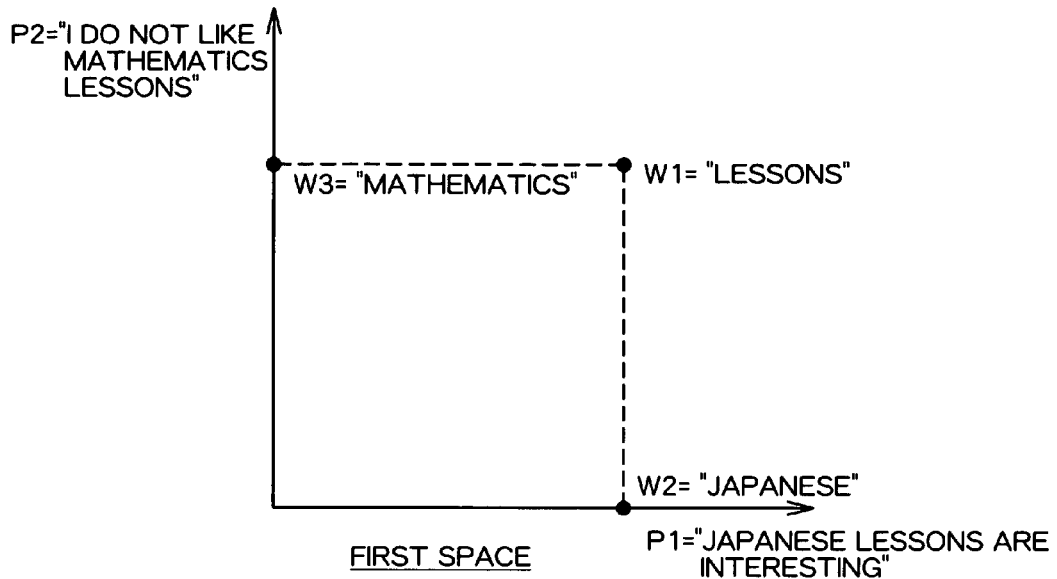
FIG. 1 is a diagram schematically showing a first space prepared by a symbol analyzing device in an embodiment according to the present invention.

For example, supposing that the word W2 "Japanese" and the word W1 "lessons" are acquired from the message P1 "Japanese lessons are interesting", and that the word W3 "mathematics" and the word W1 "lessons" are acquired from the message P 2 "I do not like mathematics lessons". Then, as shown in FIG. 1, a first space having a coordinate axis corresponding to the message P1 (the lateral axis in the drawing) and a coordinate axis corresponding to the message P2 (the vertical axis in the drawing) is prepared, and the words W1, W2, W3, namely, "Japanese", "mathematics", and "lessons" are placed in the first space.

In the above, as the word W2 "Japanese" is used in the message P1 "Japanese lessons are interesting" but not in the message P2 "I do not like mathematics lessons", the coordinate component g12 corresponding to the former is defined as one, and the coordinate component g22 corresponding to the latter is defined as zero.

Meanwhile, as the word W3 "mathematics" is not used in the message P1 "Japanese lessons are interesting", and is used in the message P2 "I do not like mathematics lessons", the coordinate component g13 corresponding to the former is defined as zero, and the coordinate component g23 corresponding to the latter is defined as one. Further, as the word W1 "lesson" is used in both of the message P1 "Japanese lessons are interesting" and the message P2 "I do not like mathematics lessons", the coordinate components g11, g21 corresponding to both of these are respectively defined as one.

It should be noted that the value gki may be determined in any manner as long as the value is calculated according to the use of the word Wi in the k message. For example, the number of the word Wi used in the k-th message may be used as the value gki.

Thereafter, based on the position coordinates of each of the words placed in the first space, the symbol analyzing device calculates one or more characteristic directions in the first space. A characteristic direction may be determined as a direction or the like which represents an area, for example, where words are concentrically placed in the first space.

Here, the characteristic direction of the first space is calculated as follows. That is, the similarities Hij of the position coordinates gi of the word Wi and the position coordinates gj of the word Wj are calculated using Expression (2). Further, as shown in Expression (3), the similarity matrix H of (N×N) which has similarities Hij as ij elements is obtained, in which N refers to the total number of words to be analyzed. Then, all or some of the eigenvectors of the similarity matrix H are each defined as a characteristic direction.

[Expression 2]

$$Hij = \sum_k \frac{g_{ki} \cdot g_{kj}}{\|g_i\| \cdot \|g_j\|} \quad (2)$$

$$= \frac{g_i \cdot g_j}{\|g_i\| \cdot \|g_j\|}$$

[Expression 3]

$$H = \begin{pmatrix} W_1 & W_2 & W_3 & \ldots & W_n \\ H_{11} & H_{12} & H_{13} & \ldots & H_{1n} \\ H_{21} & H_{22} & H_{23} & \ldots & H_{2n} \\ H_{31} & H_{32} & H_{33} & \ldots & H_{3n} \\ \vdots & \vdots & \vdots & & \vdots \\ H_{n1} & H_{n2} & H_{n3} & \ldots & H_{nn} \end{pmatrix} \begin{matrix} \\ W_1 \\ W_2 \\ W_3 \\ \vdots \\ W_n \end{matrix} \quad (3)$$

A similarity matrix is a real symmetric matrix, and the eigenvector thereof can be calculated by means of power multiplication. Power multiplication has a function for enhancing a characteristic element of a matrix element and averaging a non-characteristic element of the same. Therefore, an eigenvector which is calculated by means of power multiplication can be considered as expressing the characteristic direction implicated in the first space, in an explicit manner.

It should be noted that the characteristic direction calculating means according to the present invention is not limited to the means for calculating an eigenvector of a similarity matrix, as described above, and may be any means as long as the means calculates a direction which is characteristic in the first space. For example, a direction or the like in the first space in which symbols are concentrically placed may be considered as a characteristic direction.

Figure 2:
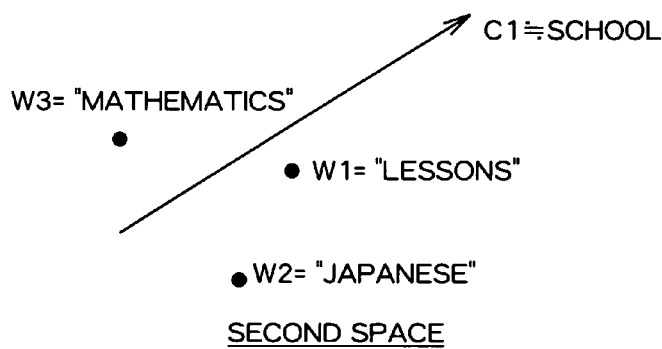
FIG. 2 is a diagram schematically showing a second space prepared by the symbol analyzing device in an embodiment according to the present invention.

Next, as shown in FIG. 2, a second space which is defined by the coordinate axes each corresponding to the characteristic direction calculated as described above is prepared. Then, each word is replaced in the second space, and the position coordinates of each word in the second space are calculated. The coordinate axes of the second space each correspond to each of the characteristic directions in the first space, and each represent an actual typical meaning of a word of a certain kind.

When the position coordinates of each word in the second space are obtained, specifically, an inner product of a vector indicative of the position coordinates of each word in the first space and the eigenvector of the similarity matrix indicative of each characteristic direction in the first space with the magnitude of one is obtained. Then, the obtained value is used as the component of the position coordinates of the word in the second space, the component relative to the coordinate axis corresponding to that characteristic direction. That is, the inner product of the unit vector ei indicative of the characteristic direction in the first space (that is, the i-th eigenvector of the similarity matrix H with the magnitude of one) and the position coordinates of the word Wj is used as the i component of the position coordinates of the word Wj in the second space. In the above, $1 \leq i \leq M$ is held, with M representing the total number of characteristic directions.

Thereafter, the symbol analyzing device displays a space image representative of all or a part of the second space where the position coordinates of each word are distinctively shown on the monitor such as a CRT. For example, the space image may contain straight line images each indicative of each of the coordinate axes of the second space and a marker image indicative of the position coordinates of each word in the second space. In the above, the space image may contain a marker image indicative of the position of a given message in the second space. It should be noted that the message may be the one acquired from the electronic bulletin board for symbol analysis. Alternatively, the message may be a message different from the one acquired for symbol analysis.

Figure 3:
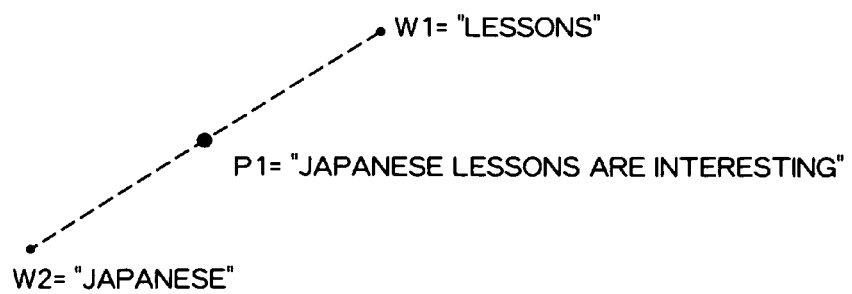
FIG. 3 is a diagram explaining a method for calculating position coordinates of a message.

Here, it is determined that the position coordinates of the given message in the second space are defined as the barycenter of the position coordinates of the words contained in the message in the second space. For example, as shown in FIG. 3, the position coordinates of the message P1 "Japanese lessons are interesting" in the second space are defined as the barycenter of the position coordinates of the word W1 "lessons" and those of the word W2 "Japanese" in the second space.

Figure 4:
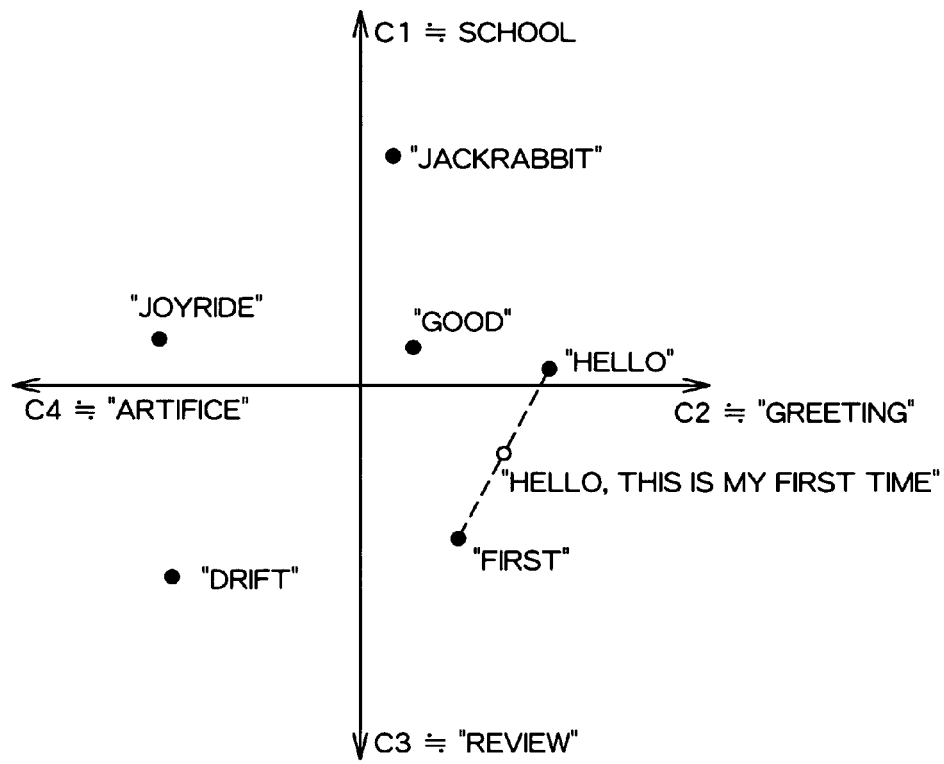
FIG. 4 is a diagram showing an example of a space image to be displayed for symbol analysis.

FIG. 4 is a diagram showing an example of a space image to be shown on the monitor of the symbol analyzing device. In this drawing, a word used in a message which is exchanged among the players of an on-line car racing game is to be analyzed. Accordingly, a message exchanged among the players of an on-line car racing game is input to the symbol analyzing device.

The space image shown in FIG. 4 represents the second space calculated as described above, in which the straight lines C1 through C4 indicative of the coordinate axes of the second space, and marker images (a black circle in the drawing) indicative of the positions of the respective words in the second space image are shown. Beside the respective marker images, the words located therein are shown.

Further, the position of the message "hello, this is my first time" in the second space is indicated by a marker image (a white circle in the drawing). The marker image is shown at the barycenter of the position "first time" and the position "hello". It should be noted that the labels "support", "greeting", "review", and "artifice", which are shown beside the straight lines C1 through C4 respectively, are post hoc manually input by the user of the symbol analyzing device. Alternatively, displaying of these labels may be omitted.

According to this space image, it can be understood that it is possible to estimate that the words "hello", "jackrabbit", and "joyride" among the words being exchanged among the players of an on-line car racing game are being used to express different meanings in different situations, and that the words "good" and "hello" are being used to express similar meanings which may possibly be used in the same message.

Figure 5:
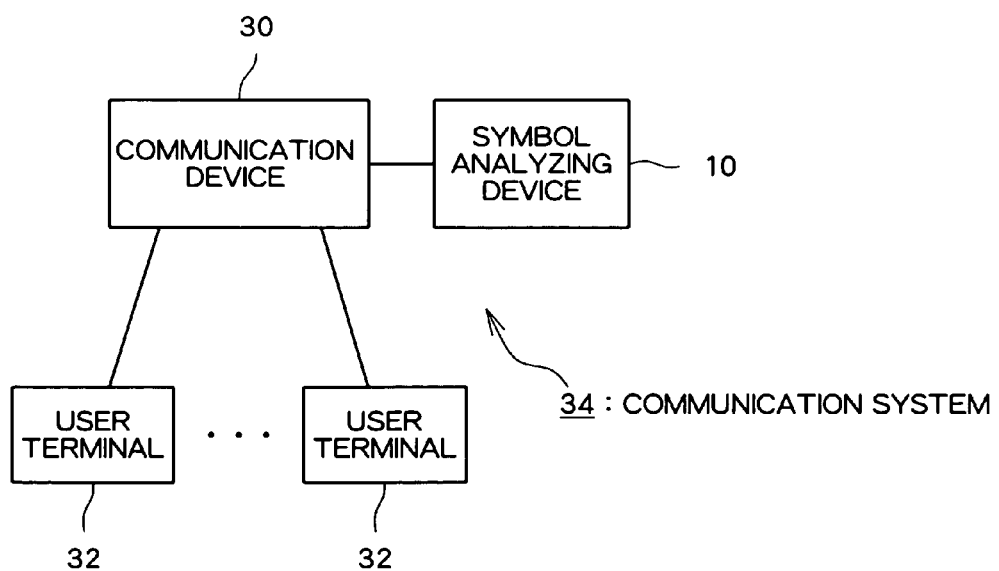
FIG. 5 is a diagram showing an overall structure of a communication system.

In the following, a communication system, such as an electronic bulletin board system, which incorporates the present symbol analyzing device 10 will be described. FIG. 5 is a diagram showing the overall structure of the communication system. As shown in FIG. 5, the communication system 34 is constructed comprising a communication device 30, a plurality of user terminals 32, and a symbol analyzing device 10. The communication device 30 presents an electronic bulletin board service to a plurality of users, and is connected to a plurality of user terminals 32 for communication via a data communication network such as the Internet.

Each user inputs a message using a user terminal 32. The input message is recorded in the communication device 30. Further, each user can receive a group of messages (messages sent from a plurality of users) recorded in the communication device 30, using the user terminal 32, and operate to display the received message on the monitor of the user terminal 32.

Figure 6:
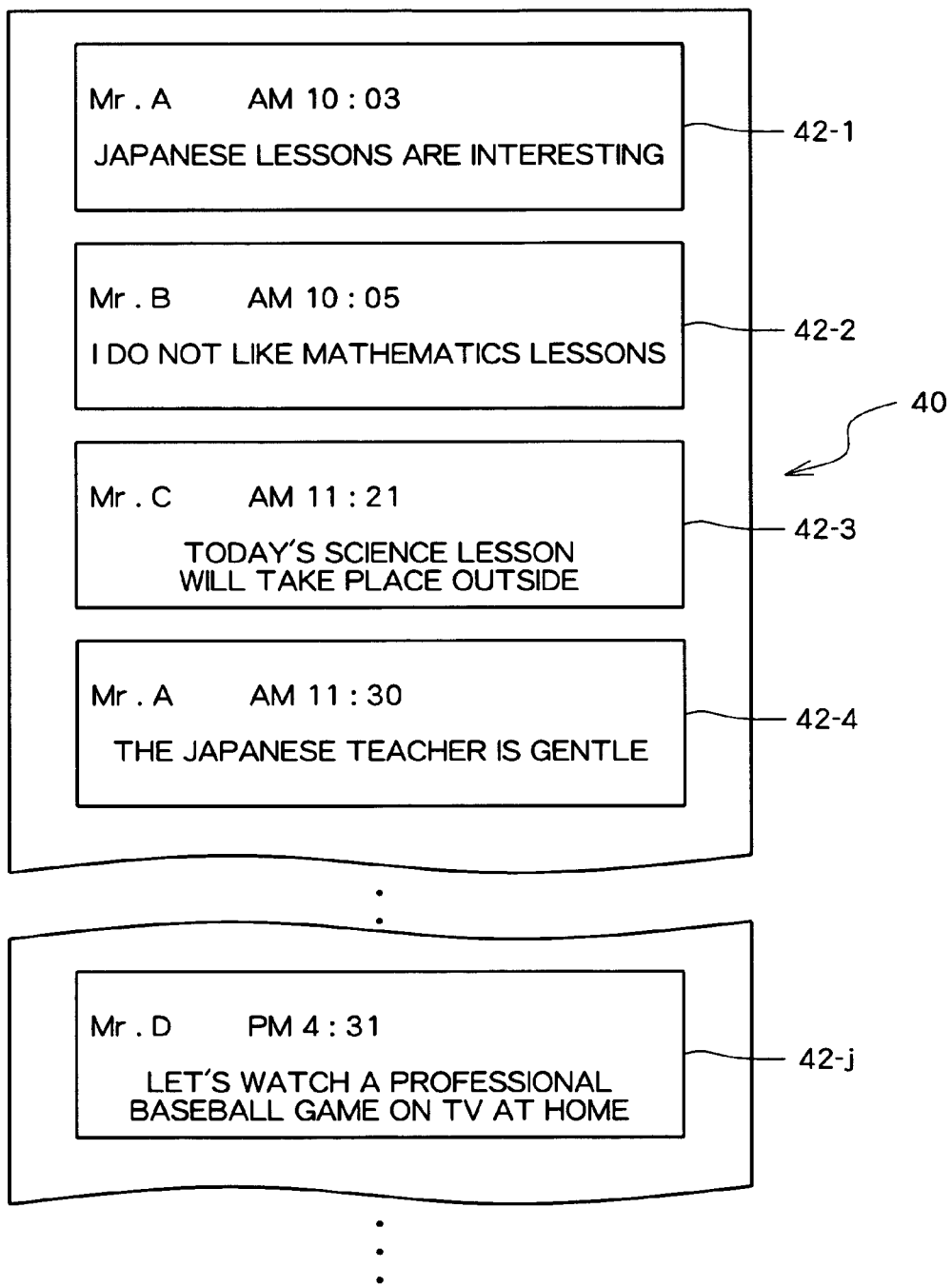
FIG. 6 is a diagram showing an example of an electronic bulletin board.

FIG. 6 is a diagram showing an example of a display screen of a monitor of each user terminal 32. As shown in FIG. 6, an electronic bulletin board 40 is shown on the monitor. In the electronic bulletin board 40, the messages 42-1 through 42-j having been input by the plurality of users (persons A to D, and so forth) are listed from the top to the bottom of the screen in the order of being input. Each message is shown together with the name of a person who inputted the message and a time at which the message was input. The content of the electronic bulletin board 40 is recorded in the communication device 30, and displayed on the monitor of each user terminal 32, so that a plurality of users can share the message. The symbol analyzing device 10 uses the recorded content of the electronic bulletin board 40, in a symbol analysis.

Figure 7:
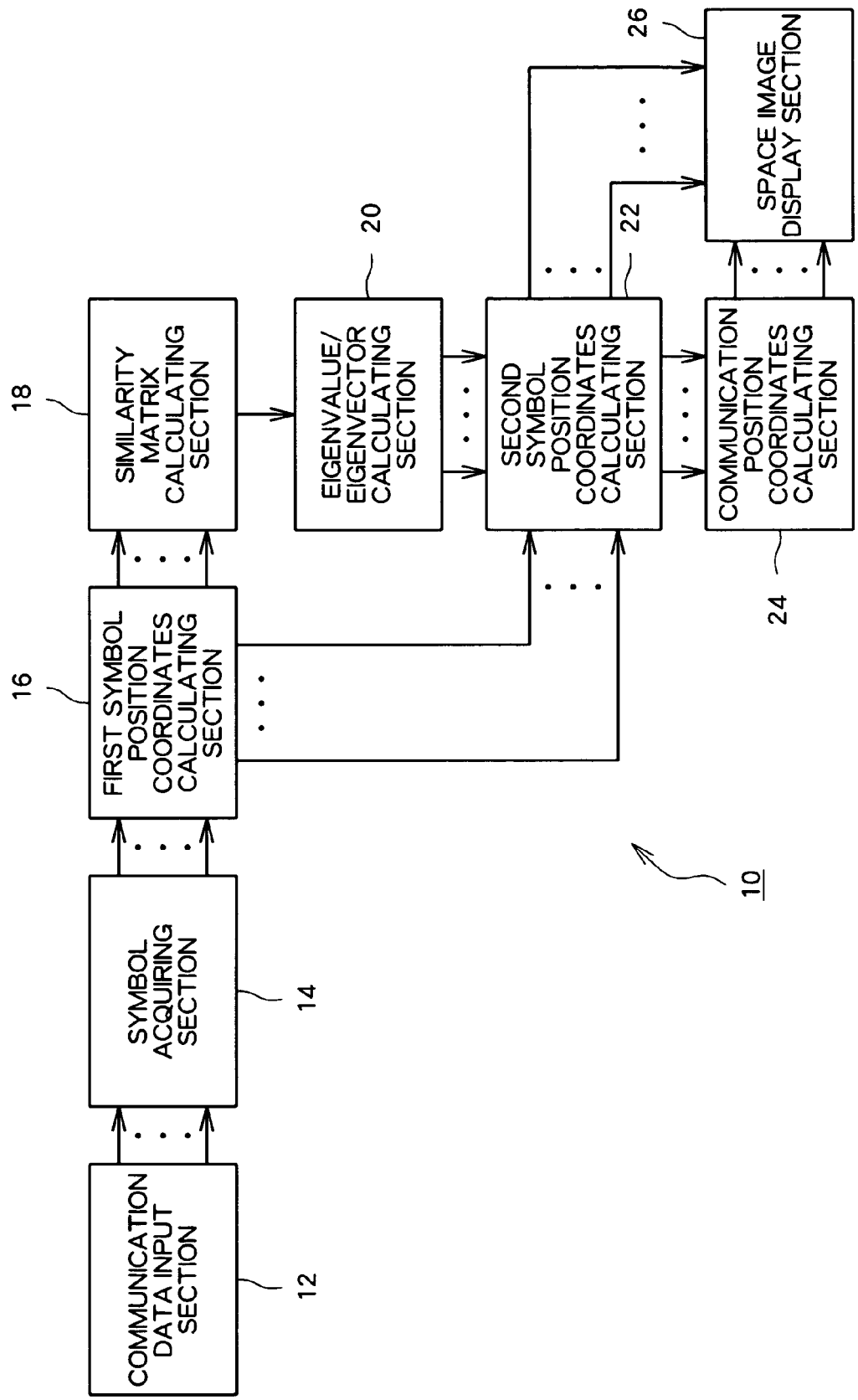
FIG. 7 is a functional block diagram showing the symbol analyzing device in an embodiment of the present invention.

FIG. 7 is a block diagram showing a functional structure of the symbol analyzing device 10. The symbol analyzing device 10 is realized using a known computer system. Specifically, the symbol analyzing device 10 reads, and has installed, a symbol analyzing program into which the present invention is incorporated, from an information storage medium. When the symbol analyzing device 10 thereafter executes the program, a communication data input section 12, a symbol acquiring section 14, a first symbol position coordinates calculating section 16, a similarity matrix calculating section 18, an eigenvalue/eigenvector calculating section 20, a second symbol position coordinates calculating section 22, a communication position coordinates calculating section 24, and a space image display section 26 are realized.

The communication data input section 12 is used to input data on each message 42 shown on the electronic bulletin board 40, which is recorded in the communication device 30, to the symbol analyzing device 10. Data may be input in the form of a text file from a computer-readable information storage medium or via a variety of communication means, for example.

With respect to each message which is input via the communication data input section 12, the symbol acquiring section 14 cuts off, to thereby obtain, words used in each message. The first symbol position coordinates calculating section 16 calculates the position coordinates of the word acquired by the symbol acquiring section 14, in the first space as described above. The thus calculated position coordinates are supplied to the similarity matrix calculating section 18 and the second symbol position coordinates calculating section 22.

The similarity matrix calculating section 18 calculates the similarities Hij between the words using the above described Expression (2), and also a similarity matrix H which uses the respective thus calculated similarities Hij as matrix elements. The eigenvalue/eigenvector calculating section 20 calculates an eigenvalue/eigenvector of the similarity matrix H calculated as described above. As a similarity matrix H is a real symmetric matrix, the eigenvalue/eigenvector thereof can be readily obtained using a method, such as power multiplication, and so forth, which is appropriate for computer processing.

The second symbol position coordinates calculating section 22 selects all eigenvectors calculated as described above, or a predetermined number of the same beginning with the one with the largest eigenvalue, so that the selected eigenvectors are normalized and used as vectors indicative of the characteristic direction of the first space. Then, the second symbol position coordinates calculating section 22 calculates an inner product of each of these vectors and the position coordinates supplied from the first symbol position coordinates calculating section 16, to thereby calculate the position coordinates of each word in the second space. These position coordinates are supplied to the communication position coordinates calculating section 24 and the space image display section 26.

The communication position coordinates calculating section 24 obtains a message to be mapped in the second space, and obtains words used in that message. Then, the position of the barycenter of the position coordinates of the words in the second space is determined as the position of the message in the second space. Then, the position coordinates of the barycenter are supplied to the space image display section 26.

The space image display section 26 displays the image of the second space on the monitor, while distinctively displaying the position coordinates of each word supplied from the second symbol position coordinates calculating section 22 and the position coordinates of each message supplied from the communication position coordinates calculating section 24.

According to the symbol analyzing device 10 described above, it is possible to visualize, in the form of a space image, the manner in which the words constituting a message group being actually exchanged are actually used. By reviewing the space image, the real present meaning of the word can be determined.

It should be noted that the present invention is not limited to the above-described embodiment, and may include many other modifications. For example, although each message 42 which constitutes an electronic bulletin board 40 is input to the communication data input section 12 in the above description, as for many kinds of electronic bulletin boards, the whole of each electronic bulletin board may be input as one communication to the communication data input section 12. This manner also makes it possible to analyze the actual meaning of the symbols as the respective symbols exchanged via each electronic bulletin board have mutual correlation.

Alternatively, the messages being exchanged via the electronic bulletin board may be classified according to the time at which the massage is input, and messages for every classified group may be input as one message to the communication data input section 12. As the meaning of the symbols may vary depending on a time band even when the symbols are exchanged via a single board, this method makes it possible to more accurately analyze the meaning of each symbol in such a case.

In the above, a value indicative of the frequency at which each word in each message is used or a value indicative of whether or not the word is used in the message is used as each coordinate component concerning the position of the word in the first space. Meanwhile, in the case where the whole electronic bulletin board 40 is input as one communication to the communication data input section 12, a value indicative of the number of persons who use the concerned word, in other words, the number of users, may be used as a coordinate component corresponding to the electronic bulletin board concerning the position of the word.

Also, a weight value may be determined according to the attribute of a message sender (for example, an age, an income, a period of time to use the communication system 34, and so forth), and the number of users may be calculated using the weight value.

Further, a weight value may be determined for each electronic bulletin board (communication), and after a value depending on the use of each symbol in each electronic bulletin board is determined, the weight value of each electronic bulletin board may be multiplied by that value, as a result of which the actual position coordinates of each symbol in the first space are calculated.

When the position coordinates of each word in the first space are determined depending on the frequency at which the word is used in each message, the frequency of use may be counted in a manner such that the smaller weighting is given to the earlier use in order. For example, supposing that a certain symbol is used in communications at time Ti, $\Sigma\{\alpha/(TC-Ti)\}$ may be used as a coordinate component corresponding to that communication for that word. In the above, $\Sigma$ represents the sum with respect to i, $\alpha$ represents a constant, and TC represents the current date and time.

Alternatively, a message to be exchanged via a single electronic bulletin board may be classified according to the sender's attribute, and the messages for every classified group may be input as one message to the communication data input section 12. As there maybe a case in which the meaning of a symbol exchanged via a single electronic bulletin board may be changed depending on the sender's attribute (age, sex, or the like), this method can more accurately analyze the meaning of each symbol even in such a case.

Alternatively, the position coordinates of each symbol in the first space may be calculated depending on the frequency at which comments are made. For example, the frequency of use (appearance frequency) of a symbol Wj in a communication Pk may be used as the k component gki of the position coordinates of the symbol Wj in the first space. In this case, the frequency of use by a single person may be determined as gki, or the frequency of use by all persons may be used as gki.

Also, it is assumed in the above description that an electric mail, a chat message, one sentence written into an electronic bulletin board, a transmission unit, or a collection of these are considered as a communication, and a symbol is considered as a word used therein. Meanwhile, a communication may take the form of an exchange of an item in a network game system. In this case, an item corresponds to a symbol.

Alternatively, a communication may take the form of a match in a network match game system, in which case an attacking skill to attack a match opponent or a defending skill to prevent an attack corresponds to a symbol.

As a further alternative, a communication may take any form, and a symbol may be selected accordingly. In this case, when each game is carried out in a virtual space, an exchange of a symbol that has taken place for every place may be considered to be a message, and may be input to the communication data input section 12. As there is a case in which the same symbol may be used differently in a different place in a virtual space, this arrangement enables accurate analysis of a symbol while considering such a situation.

The invention claimed is:

1. A symbol analyzing device for analyzing a symbol used in a plurality of communications, comprising:
symbol acquiring device configured to acquire, for each of the plurality of communications, one or more symbols used in the communication;
first symbol position coordinates calculating device configured to calculate position coordinates of each symbol acquired for each of the plurality of communications by the symbol acquiring device, in a first space having coordinate axes each corresponding to each of the plurality of communications;

characteristic direction calculating device configured to calculate one or more characteristic directions in the first space based on the position coordinates calculated by the first symbol position coordinates calculating device; and second symbol position coordinates calculating device configured to calculate position coordinates of each symbol acquired by the symbol acquiring device, in a second space having coordinate axes each corresponding to each of the characteristic directions calculated by the characteristic direction calculating device, based on the characteristic directions calculated by the characteristic direction calculating device and the position coordinates calculated by the first symbol position coordinates calculating device, wherein the first symbol position coordinates calculating device calculates, with respect to each symbol, position coordinates which include, as coordinate components thereof, values calculated depending on use of the symbol in each communication, and wherein the second symbol position coordinates calculating device calculates position coordinates in the second space, of each symbol acquired by the symbol acquiring device, based on an inner product of the characteristic direction calculated by the characteristic direction calculating device and the position coordinates calculated by the first symbol position coordinates calculating device.

2. The symbol analyzing device according to claim 1, further comprising space image displaying device configured to display all or part of a space image of the second space where the position coordinates calculated by the second symbol position coordinates calculating device are distinctively displayed.

3. The symbol analyzing device according to claim 1, wherein the characteristic direction calculating device calculates one or more eigenvectors of a similarity matrix which has, as elements, similarities between the position coordinates calculated by the first symbol position coordinates calculating device, and determines the one or more eigenvectors to be one or more characteristic directions.

4. The symbol analyzing device according to claim 1, further comprising communication position coordinates calculating device configured to calculate, for a communication included in, or different from, the plurality of communications, position coordinates of the communication in the second space, based on the position coordinates of symbols used in the communication, in the second space.

5. The symbol analyzing device according to claim 4, wherein the space image displaying device displays the space image where the position coordinates calculated by the communication position coordinates calculating device are additionally distinctively displayed.

6. A symbol analyzing method for analyzing a symbol used in a plurality of communications, comprising:

acquiring, for each of the plurality of communications, one or more symbols used in the communication;

first calculating position coordinates of each symbol acquired for each of the plurality of communications in the acquiring step, in a first space having coordinate axes each corresponding to each of the plurality of communications;

calculating one or more characteristic directions in the first space based on the position coordinates calculated in the first calculating step; and second calculating position coordinates of each acquired in the symbol acquiring step, in a second space having coordinate axes each corresponding to each of the characteristic directions calculated in the calculating characteristic direction step, based on the characteristic direction calculated at the calculating characteristic directions step and the position coordinates calculated in the first calculating step, wherein, in the first calculating step, with respect to each symbol, position coordinates which include, as coordinate components thereof, values calculated depending on use of the symbol in each communication, are calculated, and wherein, in the second calculating step, position coordinates in the second space, of each symbol acquired in the acquiring step, are calculated based on an inner product of the characteristic direction calculated in the calculating characteristic direction step and the position coordinates calculated in the first calculating step.

7. The symbol analyzing method according to claim 6, further comprising a displaying all or part of a space image of the second space where the position coordinates calculated at the second calculating step are distinctively displayed.

8. The symbol analyzing method according to claim 6, wherein, in the calculating characteristic direction step, one or more eigenvectors of a similarity matrix which has, as elements, similarities between the position coordinates calculated at the first calculating step, are calculated, and the one or more eigenvectors are determined as one or more characteristic directions.

9. The symbol analyzing method according to claim 6, further comprising a third calculating, for a communication included in, or different from, the plurality of communications, position coordinates of the communication in the second space, based on the position coordinates of symbols used in the communication, in the second space.

10. The symbol analyzing method according to claim 9, wherein, in the displaying step, the space image where the position coordinates calculated in the third calculating step are additionally distinctively displayed, is displayed.

11. A non-transitory computer readable information storage medium having stored thereon a computer program that when executed cause a processor to implement a symbol analyzing method comprising:

acquiring, for each of a plurality of communications, one or more symbols used in the communication;

first calculating position coordinates of each symbol acquired for each of the plurality of communications in the acquiring step, in a first space having coordinate axes each corresponding to each of the plurality of communications;

calculating one or more characteristic directions in the first space based on the position coordinates calculated in the first calculating step; and second calculating position coordinates of each symbol acquired in the acquiring step, in a second space having coordinate axes each corresponding to each of the characteristic directions calculated in the calculating characteristic direction step, based on the characteristic directions calculated in the calculating characteristic direction step and the position coordinates calculated in the first calculating step, wherein the first calculating step calculates, with respect to each symbol, position coordinates which include, as coordinate components thereof, values calculated depending on use of the symbol in each communication, and wherein the second calculating means calculates position coordinates in the second space, of each symbol acquired in the acquiring step, based on an inner product of the characteristic direction calculated in the calculating characteristic direction step and the position coordinates calculated by the first calculating step.

12. The non-transitory computer readable information storage medium according to claim 11, wherein the program causes the processor to further implement displaying all or part of a space image of the second space where the position coordinates calculated by the second calculating step are distinctively displayed.

13. The non-transitory computer readable information storage medium according to claim 11, wherein the first calculating step calculates, with respect to each symbol, position coordinates which include, as coordinate components thereof, values calculated depending on use of the symbol in each communication.

14. The non-transitory computer readable information storage medium according to claim 13, wherein the calculating characteristic direction step calculates one or more eigenvectors of a similarity matrix which has, as elements, similarities between the position coordinates calculated by the first calculating step, and determines that the one or more eigenvectors are determined as one or more characteristic directions.

15. The non-transitory computer readable information storage medium according to claim 14, wherein the second calculating step calculates position coordinates in the second space, of each symbol acquired in the acquiring step, based on an inner product of the characteristic direction calculated in the calculating characteristic direction step and the position coordinates calculated by the first calculating step.

16. The non-transitory computer readable information storage medium according to claim 11, wherein the program causes the to further implement third calculating, for a communication included in, or different from, the plurality of communications, position coordinates of the communication in the second space, based on the position coordinates of symbols used in the communication, in the second space.

17. The non-transitory computer readable information storage medium according to claim 16, wherein the displaying step displays the space image where the position coordinates calculated in the third calculating step are additionally distinctively displayed.

* * * * *